(12) United States Patent
Hosein

(10) Patent No.: US 7,961,617 B2
(45) Date of Patent: Jun. 14, 2011

(54) SYSTEM AND METHOD FOR WIRELESS NETWORK CONGESTION CONTROL

(75) Inventor: Patrick Ahamad Hosein, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 2633 days.

(21) Appl. No.: 10/282,495

(22) Filed: Oct. 29, 2002

(65) Prior Publication Data
US 2004/0090916 A1 May 13, 2004

(51) Int. Cl.
*G01R 31/08* (2006.01)
(52) U.S. Cl. ..... 370/235; 370/335; 370/342; 370/395.43
(58) Field of Classification Search .................. 370/235, 370/335, 342, 395.43, 329, 347, 412
See application file for complete search history.

(56) References Cited

U.S. PATENT DOCUMENTS

| | | | |
|---|---|---|---|
| 5,367,523 A * | 11/1994 | Chang et al. | 370/235 |
| 5,793,744 A * | 8/1998 | Kanerva et al. | 370/209 |
| 5,920,545 A * | 7/1999 | Rasanen et al. | 370/232 |
| 5,923,650 A * | 7/1999 | Chen et al. | 370/331 |
| 6,236,656 B1 | 5/2001 | Westerberg et al. | |
| 6,335,922 B1 * | 1/2002 | Tiedemann et al. | 370/335 |
| 6,469,991 B1 * | 10/2002 | Chuah | 370/329 |
| 6,519,461 B1 * | 2/2003 | Andersson et al. | 455/453 |
| 6,591,382 B1 * | 7/2003 | Molloy et al. | 714/704 |
| 6,625,118 B1 * | 9/2003 | Hadi Salim et al. | 370/229 |
| 6,788,687 B2 * | 9/2004 | Bao et al. | 370/370 |
| 6,799,045 B1 * | 9/2004 | Brouwer | 455/453 |
| 6,807,426 B2 * | 10/2004 | Pankaj | 370/342 |
| 6,862,449 B1 * | 3/2005 | Mohebbi et al. | 455/437 |
| 6,865,185 B1 * | 3/2005 | Patel et al. | 370/412 |
| 6,901,046 B2 * | 5/2005 | Hsu et al. | 370/204 |
| 6,937,570 B2 * | 8/2005 | Bhatt et al. | 370/242 |
| 6,937,600 B2 * | 8/2005 | Takagi | 370/394 |
| 6,975,609 B1 * | 12/2005 | Khaleghi et al. | 370/335 |

(Continued)

FOREIGN PATENT DOCUMENTS

EP 1209936 A 5/2002
(Continued)

OTHER PUBLICATIONS

UW 2002/106991 A1, dated Aug. 8, 2002, Farley et al.
(Continued)

*Primary Examiner* — Ayaz R Sheikh
*Assistant Examiner* — Andrew C Lee
(74) *Attorney, Agent, or Firm* — Coats & Bennett, P.L.L.C.

(57) ABSTRACT

Congestion control provides congestion control for one or more shared resources in a wireless communication network. In one exemplary embodiment, a congestion controller manages congestion of shared packet data channels by under-serving selected ones of the data connections sharing the packet data channel. Such selective under-serving may be effected by biasing scheduling of service on the packet data channel toward maximum throughput scheduling such that connections associated with poor radio conditions are naturally under-served. Further, the controller may manage congestion of other shared resources, such as shared transmit power resources, wherein congestion of the shared power resource is managed by under-allocating transmit power to selected ones of the connections. Congestion is sensed, for example, by monitoring transmit buffer occupancy levels, and/or reserve power levels. In either case, congestion relief may be amplified where operation of the controller "triggers" flow control on the intentionally under-served ones of the active data connections.

28 Claims, 7 Drawing Sheets

U.S. PATENT DOCUMENTS

| | | | |
|---|---|---|---|
| 6,987,738 B2* | 1/2006 | Subramanian et al. | 370/252 |
| 7,003,302 B2* | 2/2006 | Yoshida et al. | 455/450 |
| 7,023,803 B2* | 4/2006 | Kakani et al. | 370/235 |
| 7,046,678 B2* | 5/2006 | Jiang et al. | 370/395.41 |
| 7,142,867 B1* | 11/2006 | Gandhi et al. | 455/453 |
| 7,237,007 B2* | 6/2007 | Kamath et al. | 709/206 |
| 7,327,694 B2* | 2/2008 | Joshi et al. | 370/253 |
| 7,394,764 B2* | 7/2008 | Ramani et al. | 370/231 |
| 7,453,845 B2* | 11/2008 | Cha et al. | 370/329 |
| 7,688,731 B2* | 3/2010 | Haumont et al. | 370/235 |
| 2002/0090003 A1* | 7/2002 | Melpignano et al. | 370/467 |
| 2002/0150048 A1* | 10/2002 | Ha et al. | 370/231 |
| 2002/0154602 A1* | 10/2002 | Garcia-Luna-Aceves et al. | 370/230 |
| 2002/0183064 A1* | 12/2002 | Gopalakrishnan et al. | 455/452 |
| 2003/0035420 A1* | 2/2003 | Niu | 370/389 |
| 2003/0064741 A1* | 4/2003 | Silva et al. | 455/522 |
| 2004/0087327 A1* | 5/2004 | Guo | 455/522 |
| 2004/0218617 A1* | 11/2004 | Sagfors | 370/412 |

FOREIGN PATENT DOCUMENTS

| | | |
|---|---|---|
| WO | WO 0072608 A | 11/2000 |
| WO | WO 02052886 A | 7/2002 |

OTHER PUBLICATIONS

Floyd and Jacobson; Random Early Detection Gateways for Congestion Avoidance; Aug. 1993; 17 pgs.

Interactions of TCP and Radio Link ARQ Protocol; Yong Bai, Andy T. Ogielski, and Gang Wu: WINGLAB, Rutgers University; 5 pgs.

* cited by examiner

SYSTEM AND METHOD FOR WIRELESS NETWORK CONGESTION CONTROL

BACKGROUND OF THE INVENTION

The present invention generally relates to controlling network congestion, and particularly relates to controlling user congestion in wireless communication networks.

Evolving wireless networks, such as those based on the cdma2000 or Wideband (WCDMA) standards, offer a mix of voice and data services. Of particular benefit to data users, such networks may offer relatively high-speed packet data channels that are time-shared among multiple data users. In this case, a packet data channel is divided into time slots and data frames are "scheduled" for transmission on the time-shared channel. Thus, the channel supports a plurality of "data connections" by time multiplexing transmissions for each of the connections onto the shared data channel. The scheduling of transmissions for each connection on the shared channel is governed by one or more service constraints.

For example, each connection (i.e., "user") may be scheduled according to a "throughput" optimization approach, in which the network operator maximizes revenue by scheduling users best able to receive data transmissions at the highest rates. However, such an approach may leave users in poorer radio conditions chronically under-served, nor does such an approach guarantee that the network will satisfy one or more Quality-of-Service (QoS) constraints that normally are associated with the data connections sharing the channel. That is, many of the evolving data applications supported by the higher data rate shared channels require defined QoS levels such as a minimum data rate and/or maximum packet jitter.

Thus, if users are served in accordance with their associated QoS constraints, they must be scheduled for service in consideration of those constraints. Newer networks might thus incorporate QoS-based user scheduling on the shared packet data channels such that the QoS constraints for each user are met on an ongoing basis, at least within the limits of network capacity and prevailing radio conditions. In furtherance of such QoS-based scheduling, the network must also consider the impact of new user admissions as regards its ongoing ability to meet the various QoS constraints and its current users.

However, even with QoS-based scheduling and admission control, the potential for network "overloading" exists because of the dynamic resource demands of both voice and data users and the stochastic nature of the bandwidth available to each user due to natural fluctuations in the radio conditions of each user (e.g., fading, interference, noise, etc.). Although such congestion is in some ways reminiscent of packet data overload in wireline IP networks, differences between wireless communication networks and traditional IP router networks make known congestion control techniques inappropriate for the wireless world.

In a traditional IP router, IP data packets are transferred to and from various other nodes (routers, switches, etc.) in the network according to packet addressing information. The router maintains a buffer or queue for holding the transient packet data as it performs its ongoing routing operations. During congestion, the router's buffer "overflows," and packet data for one or more connections is lost. The transport protocols managing those connections having lost data typically impose some form of "flow control" whereby data rates are reduced responsive to excess lost data, resulting in relatively "bursty," inefficient data transfer on the affected connections. Indeed, the widely used Transport Control Protocol (TCP) not only reduces connection data rate in response to lost packets, it further employs a "slow start" mechanism that limits a connection's data rate for some time even after congestion is relieved, even if the prevailing conditions associated with that connection would support an immediate return to the pre-congestion data rate.

With the above behavior, even momentary congestion among a substantial number of connections can lead to a "congestion collapse," where the transport protocols of the affected connections enforce a prolonged and possibly significant reduction in connection data rate responsive to detected packet loss. That is, if flow control is triggered across a sizeable number of connections, the aggregate data throughput of the network is temporarily reduced to a level well below what it can actually support, leading to inefficient utilization of network capacity.

Algorithms directed to alleviating such problems in traditional routing networks are generically referred to as "Adaptive Queue Management" (AQM) algorithms. One species of such algorithms is referred to as "Rapid Early Discard" (RED), and is based on randomly discarding data packets when router buffer "occupancy" reaches a defined threshold. The random discarding of packets causes a relatively small subset of the total TCP connections supported by the router to reduce their congestion windows, which results in a reduction of the router's traffic load and hopefully avoids congestion collapse.

While such approaches yield congestion control benefits in traditional routing systems, they do not complement the structure and operation of packet routing operations within the context of wireless communication networks. For example, wireless networks commonly employ some type of Radio Link Protocol (RLP) that provides the network with a radio link layer frame error recovery mechanism. RLP provides for data retransmissions on the inherently unreliable wireless links connecting the network to the remote mobile stations. RLP as implemented in cdma2000 and WCDMA networks is an "ARQ" based protocol that uses a timeout/NACK approach to recognizing when transmitted data was or was not properly received.

As IP packets typically span several RLP "frames," the loss of even one RLP frame causes an IP packet loss for the affected data connection. Thus, any overload control scheme that involves packet/frame discarding should incorporate knowledge of the IP packet/RLP frame relationship for efficient overload control operation.

Further, the ideal approach to overload control within wireless networks would consider the scheduling objectives and connection characteristics of the wireless network users subjected to overload control. By incorporating such considerations into overload control, a wireless network could avoid congestion collapse, while simultaneously observing ongoing scheduling or service priorities to the greatest extent possible.

SUMMARY OF THE INVENTION

The present invention comprises a method and apparatus to control congestion (e.g., overloading, over-use, etc.) of a shared network resource that supports a plurality of data connections by "under-serving" selected ones of those data connections responsive to detecting congestion. In general terms, under-serving the selected data connections reduces congestion by increasing the utilization efficiency of the shared resource. For example, in an exemplary embodiment, the under-served data connections are those connections associated with poor radio conditions relative to the other data connections. Users in poor radio conditions are "inefficient" in that they take too long to serve, i.e., they cannot be served at high data rates, or they consume too much of a shared transmit power resource, i.e., the transmit power required to achieve acceptable received quality is disproportionately high for such users.

Thus, where the shared resource is a time-shared packet data channel, under-serving the selected data connections comprises temporarily biasing service on the shared channel toward those users in better radio conditions, thereby increasing the "capacity" of the channel by avoiding service to users that can receive data only at lower, inefficient data rates. Similarly, where the shared resource is a total available transmit power, under-serving the selected data connections comprises reducing total allocated power by intentionally allocating less power than is requested for the under-served connections, which correspond to the users experiencing relatively poor radio conditions.

In at least some embodiments, the data connections subject to the inventive congestion control are "flow-controlled" data connections. For example, the data connections may operate under higher-layer flow control protocols such as the Transport Control Protocol (TCP). Such flow-control protocols generally include a data reduction mechanism that is triggered by excess data loss on the controlled data connection. Therefore, under-serving the selected connections is tantamount to intentionally triggering such data reductions by causing transmit data buffering overflow, with resultant data losses, on the selected data connections. Imposition of data rate reductions by the flow control mechanisms on the under-served connections further reduces congestion.

The inherent behavior of data connection flow controls thus may be exploited by the inventive congestion controller to enhance its congestion reduction operations. Moreover, by precipitating (triggering) such data reductions on the selected connections, the congestion controller avoids the so-called "congestion collapse" that might otherwise occur if congestion-related data loss began occurring across a wider set of the data connections.

In one exemplary embodiment, a congestion controller manages congestion of a shared packet data channel used to transmit data in time-multiplexed fashion to a plurality of users having data connections supported by the shared channel. In this context, the congestion controller monitors transmit data buffer occupancy levels for each data connection, and interprets a rise in such levels as an indicator of impending channel congestion. If occupancy rises above a minimum threshold, the congestion controller modifies the operation of a service scheduler managing the time-scheduled transmissions of data on the shared channel by biasing operation of the scheduler such that data connections having low average served data rates are disfavored.

Thus, the "selection" process is a form of implicit selection rather than explicit selection as the service scheduler is modified to disfavor those data connections that cannot be served at the higher rates, i.e., those connections associated with users in relatively poor radio conditions. The extent to which the service scheduler's bias is temporarily shifted toward maximizing data throughput by serving the higher rate data connections may be made proportional to the detected levels of congestion. For example, the service scheduler may be wholly dedicated to meeting Quality-of-Service (QoS) constraints on all data connections if congestion is below the minimum threshold, and then be proportionately shifted toward maximum throughput scheduling as congestion level approaches a maximum threshold. Above the maximum congestion threshold, the scheduler may be made to operate wholly as a maximum throughput scheduler. Of course, the present invention permits other approaches to changing scheduling bias.

In another exemplary embodiment, a congestion controller manages congestion (overload) of shared transmit power at a radio base station or other transmitter entity within a wireless communication network. In this case, the total available transmit power is shared among the data connections where each data connection is supported by a transmit signal, e.g., a dedicated forward link channel signal, that consumes an allocated portion of the total available transmit power. Here, a remote receiver, such as a mobile handset, requests a transmit power level that results in it receiving the corresponding transmit at a sufficient signal quality. Thus, the transmit signals targeted to receivers with poor radio conditions, e.g., fading, interference, distance, etc., are "inefficient" in that they require disproportionate allocations of the total available transmit power.

Thus, in response to detecting overuse of the shared transmit power resource, the congestion controller under-serves selected ones of the data connections by intentionally allocating less than the requested transmit power to those connections. In under-allocating transmit power to the selected data connections, the congestion controller reduces the aggregate transmit power allocated at the base station, thereby reducing overload of the shared transmit power. Further, under-allocating power to the selected connections increases the likelihood of transmit buffer overflows and resultant data losses on the selected connections. Thus, if those connections are subject to flow control at the higher protocol layers, the reduction in loading is enhanced when flow-control imposed data reductions are imposed on the selected connections responsive to the loss of data arising from buffer overflow.

In embodiments directed to controlling congestion relative to shared transmit power, such congestion or overloading may be detected in a number of ways, such as by monitoring allocated or reserve power at the base station, or by monitoring transmit buffer occupancy levels for the data connections. Buffer occupancy serves as a "proxy" for transmit power loading in that high levels of buffer occupancy for the data connections implies a higher incidence of data retransmissions due to poor reception conditions. Thus, the congestion controller can roughly infer the level of power allocated at the base station based on its observation of the buffer occupancy rates and therefore base its congestion control on those occupancy rates.

DETAILED DESCRIPTION OF THE INVENTION

Figure 1:
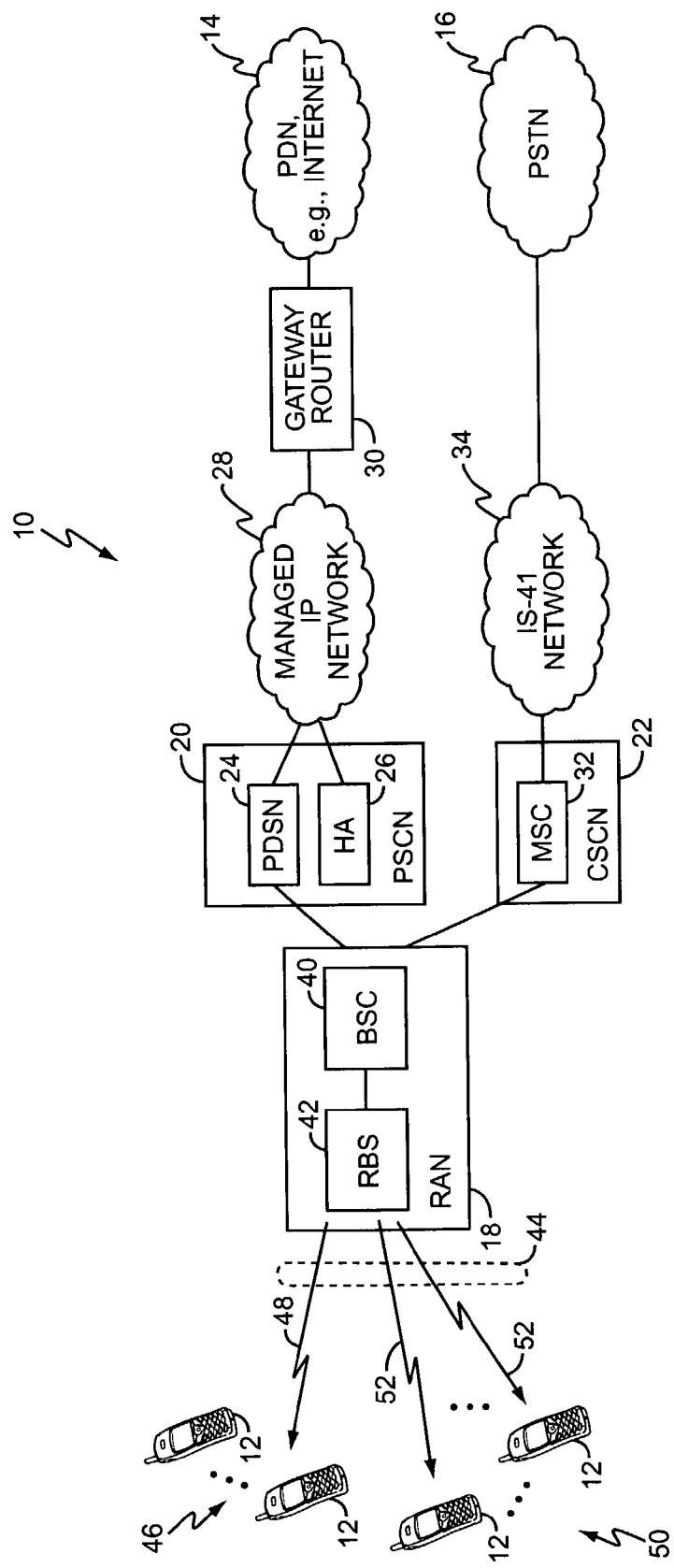
FIG. 1 is a diagram of an exemplary wireless communication network.

FIG. 1 illustrates an exemplary wireless communication network 10, which may be implemented, for example, in accordance with cdma2000 standards. Those skilled in the art will appreciate that network 10 may be implemented according to a wide range of other network standards, including IS-95, WCDMA, GSM/GPRS, and that other network implementations might use different architectures and different nomenclature for the various network entities.

Network 10 communicatively couples a plurality of mobile stations 12 to various external networks, such as Public Data Networks (PDNs) 14, e.g., the Internet, and the Public Switched Telephone Network (PSTN) 16. A Radio Access Network (RAN) 18 provides the interface between the mobile stations 12 and a Packet Switched Core Network (PSCN) 20, and to a Circuit Switched Core Network (CSCN) 22.

In an exemplary embodiment, PSCN 20 includes a Packet Data Serving Node (PDSN) 24 and a Home Agent (HA) 26, and is coupled to PDN 14 through a managed IP network 28 and a gateway router 30. In turn, the CSCN 22 includes a Mobile Switching Center (MSC) 32 that is coupled to a supporting IS-41 network 34, and provides traditional circuit-switched communication capabilities allowing mobile stations 12 to communicate with users of the PSTN 16. Those skilled in the art should understand that details of network 10 may be varied without affecting the present invention, and in at least some embodiments, the present invention may be practiced with or without the combination of circuit-switched and packet-switched communication capabilities in network 10.

However, a first exemplary embodiment of the present invention relates more particularly to the service capabilities associated with packet-switched wireless communication networks. Thus, in an exemplary embodiment, RAN 18 comprises a Base Station Controller (BSC) 40 and an associated Radio Base Station (RBS) 42 that are configured to relay data (traffic and signaling) between the mobile stations 12 and the PSCN 20 and CSCN 22. More particularly, operating under control of BSC 40, RBS 42 provides an air interface 44 that supports one or more forward link transmit channels on which data is conveyed to the mobile stations 12 and one or more reverse link receive channels on which data is received from the mobile stations 12. In an exemplary embodiment, at least one of the forward link channels supported by RBS 42 is a shared packet data channel 48 used to serve a plurality of data connections associated with a group 46 of mobile stations 12. RAN 18 may further provide multiple independent forward link channels 52, with each channel 52 serving as a dedicated link to individual ones in another group 50 of mobile stations 12.

Packet data channel 48 typically comprises a relatively high capacity data channel that carries scheduled data transmissions for each one of the mobile stations 12 in group 46. That is, RBS 42 schedules data transmission service in repeating time slots on packet data channel 48 such that each mobile station 12 in the group 46 is provided with data according to one or more service objectives.

While the details of such service objectives are discussed later herein, one immediately recognizes the possibility for "overloading" packet data channel 48. That is, packet data channel 48 may not have enough capacity to meet the service requirements of all mobile stations 12 in group 46 at any given instant in time. Such capacity shortfalls arise even where the number of mobile stations 12 in the group 46 is limited with respect to the nominal capacity of packet data channel 48. In other words, the fluctuations in each mobile station's individual data needs and in the radio conditions that constrain the ability to provide data to each mobile station 12 sharing channel 48 oftentimes result in temporary periods during which the capacity of channel 48 is insufficient to completely meet the needs of all mobile stations 12 in group 46. Thus, even with a static number of users in the group 46, the congestion level of channel 48 varies over time.

If the data congestion accompanying such capacity over-utilization is permitted to persist, the network 10 will be unable to deliver data to each mobile station 12 at rates dictated by the application(s) associated with each mobile station's data connection. Because the network 10 has finite data buffering capability, data overflow will occur for some or all of the data connections associated with the mobile stations 12 in the group 46. Such data overflow may have significant deleterious effects on the overall data throughput on channel 48 because many of the applications supported by data transmission on channel 48 are oftentimes "flow controlled."

Typically, a higher-layer protocol operating within network 10, such as the Transport Control Protocol (TCP) provides such flow control. Such flow control protocols generally impose some potentially significant temporary reduction in the data transmit rate whenever a certain level of data loss is observed on a flow controlled data connection. Thus, by allowing congestion of channel 48 to persist, network 10 risks "congestion collapse" wherein the flow control mechanisms supervising data transfer on the data connections supported by channel 48 would impose significant data rate reductions on some or even all of those data connections. When flow-control is triggered across a large number of the data connections in such circumstances, channel 48 becomes substantially under-utilized because of the potentially significant temporary data rate reductions that are triggered.

Figure 2:
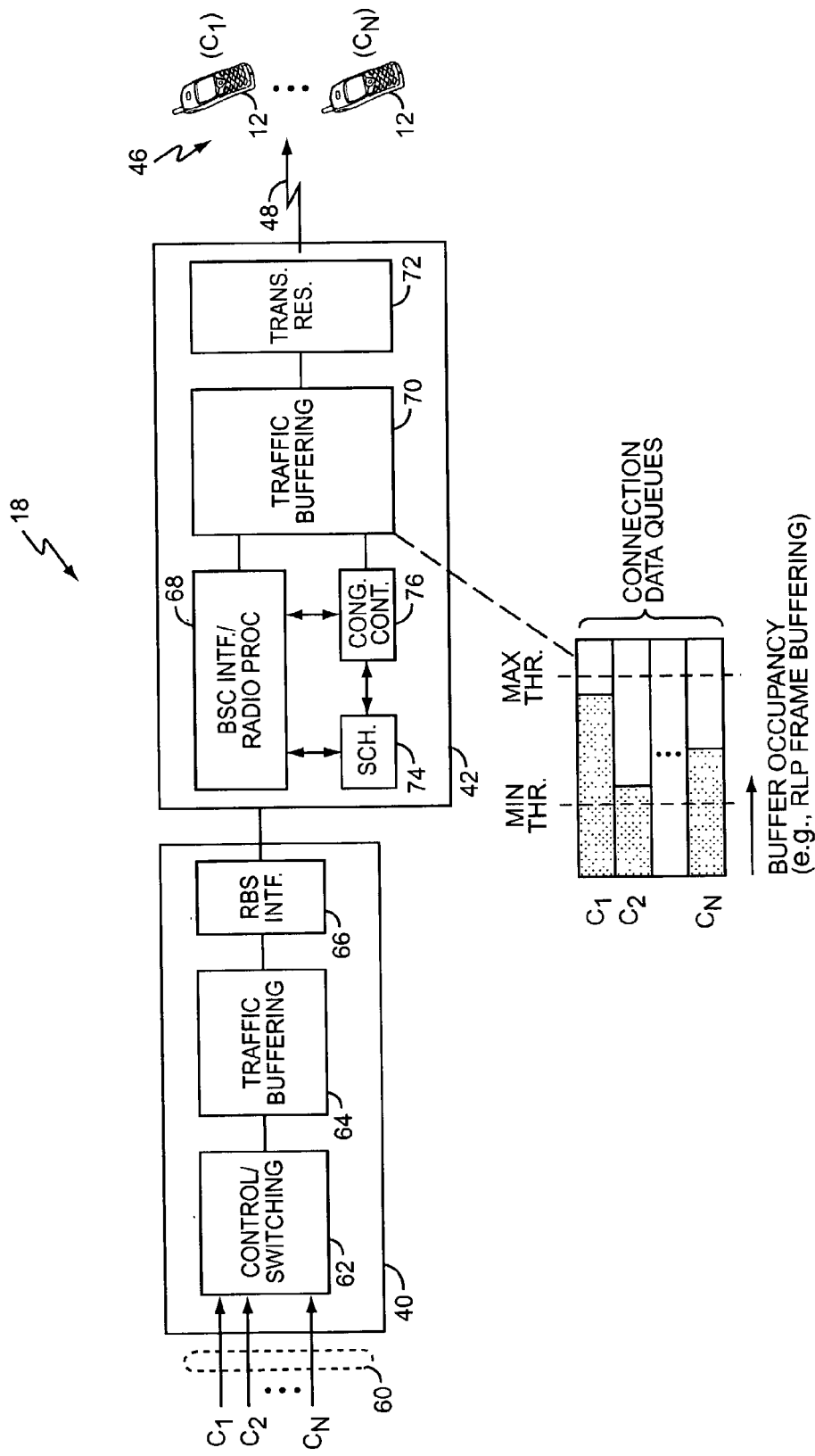
FIG. 2 is a diagram of an exemplary base station controller and associated radio base station.

FIG. 2 illustrates novel congestion control in the context of the above-described congestion on packet data channel 48. RAN 18 supports a plurality of logical data connections 60 ($C_1, C_2, \ldots, C_N$) between PSCN 20 and mobile stations 12 in the group 46 that are sharing service on packet data channel 48. In this exemplary embodiment, BSC 40 comprises control/switching resources 62, a traffic buffer 64, and a RBS interface 66. RBS 42 comprises a radio processing resources 68, including a BSC interface, a traffic buffer 70, transceiver resources 72, a service scheduler 74, and a congestion controller 76.

In operation, data packets, such as IP packets are carried on each of the data connections for transmission to the various mobile stations 12 in the group 46 at scheduled service times on packet data channel 48. The IP packets incoming to the network 10 on the plurality of data connections 60 may be processed for radio transmission according to, for example, a Radio Link Protocol (RLP) that provides a data retry protocol appropriate for the radio links of air interface 44. Commonly, a single IP packet may span multiple RLP frames. Thus, incoming IP packets are processed as RLP frames for radio transmission to respective ones of the mobile stations 12 in the group 46 based on a data packet transmission schedule imposed by scheduler 74. Because the data packets generally are not immediately transmitted, some type of data buffering is needed, with such buffering typically implemented using the data traffic buffer 70. Additional, complementary data buffering may also be implemented in BSC 40 using the additional traffic buffer 64.

As may be seen in FIG. 2, data buffering is arranged such that each one of the connections 60 has its own data queue into which the corresponding RLP frames are buffered for scheduled transmission on packet data channel 48. Such buffering is implemented at one or both the traffic buffers 64 and 70. The extent to which the available buffer space for each queue is occupied is generally termed the "buffer occupancy." As the capacity limits of packet data channel 48 are approached, buffer occupancy rises. FIG. 2 illustrates a given state of buffer occupancy for traffic buffer 70, and illustrates the queuing depth of each of the data connections 60 relative to minimum and maximum buffer occupancy levels.

In an exemplary operation, the congestion controller 76 monitors buffer occupancy or otherwise detects buffer occupancy levels as an indicator of congestion on packet data channel 48. Thus, congestion controller 76 enforces congestion control on packet data channel 48 as a function of detected buffer occupancy. The congestion controller 76 reduces congestion by modifying operation of the service scheduler 74 to increase the effective capacity of packet data channel 48 responsive to detecting a rise in buffer occupancy above the minimum congestion threshold.

In more detail, congestion controller 76 increases the capacity of channel 48 by adjusting operation of service scheduler 74 such that it temporarily shifts its scheduling objective toward providing maximum throughput scheduling for the data traffic being carried on data connections 60. With maximum throughput scheduling (Max C/I scheduling), service scheduler 74 is biased away from serving those data connections associated with mobile stations 12 that are operating in relatively poor radio conditions. That is, maximum throughput scheduling favors mobile stations 12 in good radio conditions because they are capable of receiving data at relatively high data rates and thus represent a more efficient use of packet data channel 48.

Figure 3:
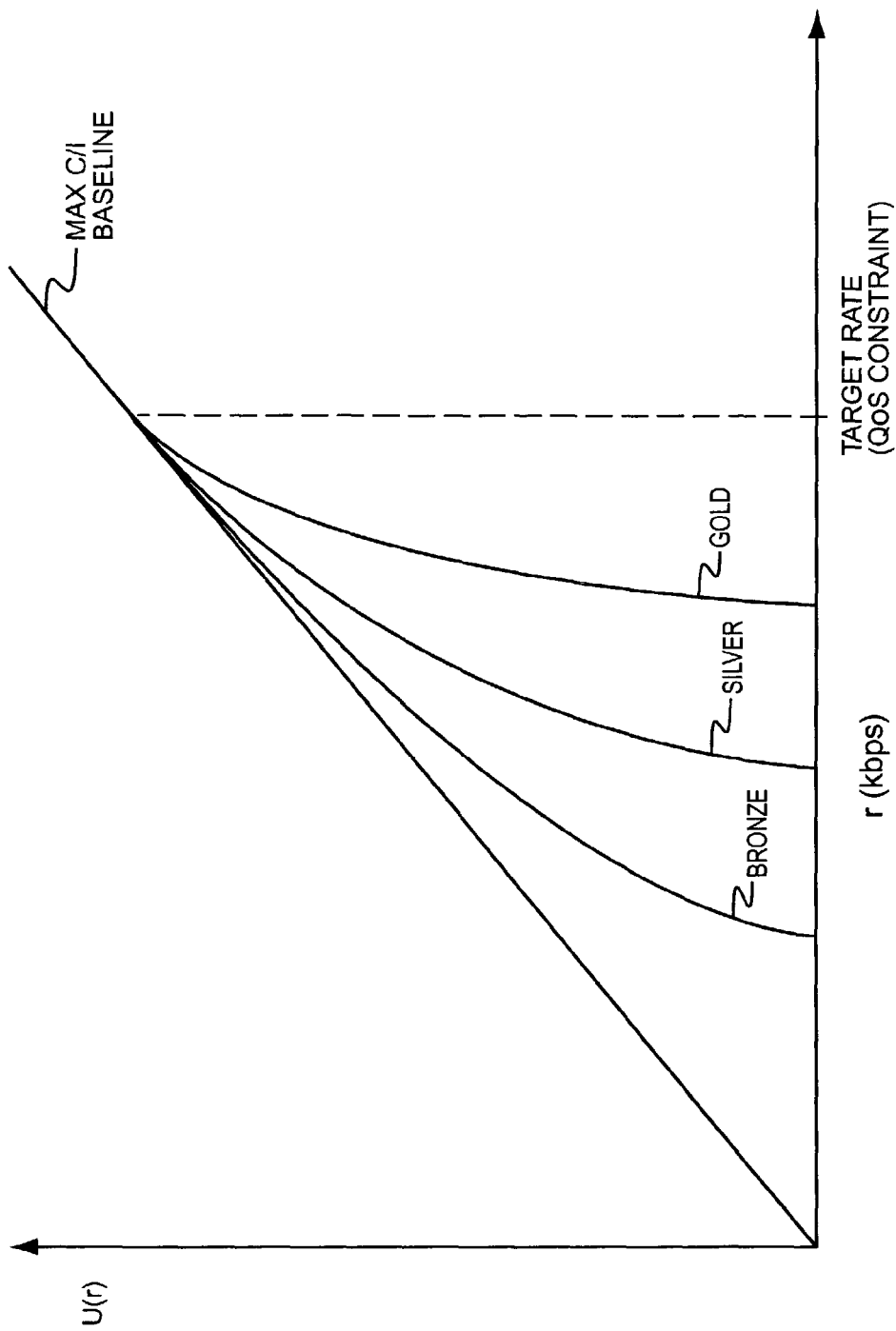
FIG. 3 is a diagram of exemplary "utility functions" for packet data channel scheduling operations based on user class QoS constraints.

To better illustrate such operation, FIG. 3 depicts exemplary service objectives that may be used by service scheduler 74 during nominal or non-congested conditions for packet data channel 48. In this exemplary embodiment, service scheduler 74 schedules packet data transmissions to the mobile stations 12 in the group 46 such that it observes one or more QoS constraints associated with each of the data connections 60.

In the illustration, the data connections 60 are associated with a targeted average data rate, which represents the nominal average served data rate to be provided to each mobile station 12. Thus, service scheduler 74 schedules packet data transmission such that data throughput to each mobile station 12 on average matches the targeted rate.

One may further note that the illustrated service objectives include user class differentiations, where the scheduling preference of the individual mobile stations 12 changes as a function of user class. As the average served rate for a given mobile station 12 falls below the targeted rate, its scheduling preference changes as a function of the associated user class. In the illustration, the priority at which under-served "gold" class users are scheduled exceeds that of "silver" class users, which, in turn, exceeds that of "bronze" class users.

Such differences in scheduling preference are imposed by altering the slope of each user's "utility" function as a function of user class designation. While not necessary for understanding the present invention, additional exemplary details regarding QoS-based scheduling may be obtained from the commonly assigned and copending U.S. patent application entitled "SYSTEM AND METHOD FOR WIRELESS NETWORK ADMISSION CONTROL BASED ON QUALITY OF SERVICE," filed on Oct. 25, 2002, and which is incorporated by reference herein. Additional background details regarding user scheduling may be gleaned from the co-pending and commonly assigned U.S. patent application entitled "SYSTEM AND METHOD FOR USER SCHEDULING IN A COMMUNICATION NETWORK," filed on Oct. 5, 2001 and assigned Ser. No. 09/972,793, and which is incorporated by reference herein.

Figure 4:
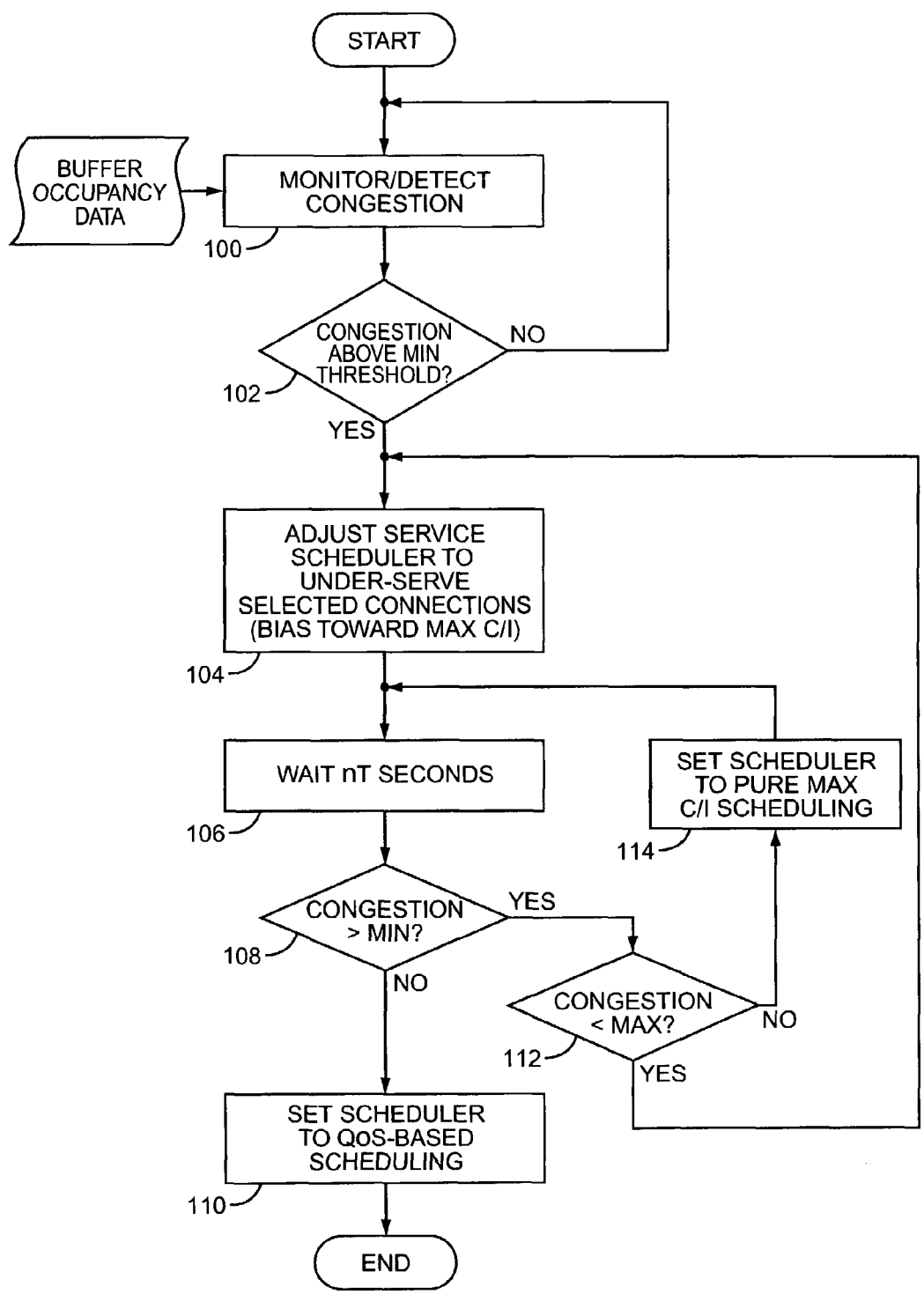
FIG. 4 is a diagram of exemplary flow logic supporting congestion management of a shared packet data channel in accordance with the present invention.

FIG. 4 illustrates exemplary congestion control for the shared packet data channel 48. It should be understood that the exemplary flow logic is executed along with any other required processing activities at RBS 42. Processing begins with the congestion controller 76 monitoring/detecting current levels of congestion (Step 100). As noted, such monitoring may involve the congestion controller detecting or otherwise measuring buffer occupancies at RBS 42 and at BSC 40, if BSC 40 provides some or all of the required data traffic buffering. Thus, in at least some embodiments RBS 42 receives periodic buffer occupancy reports from BSC 40 that permit RBS 42 to remain apprised of packet data channel congestion even if RBS 42 does not perform the data traffic buffering function. In any case, if congestion controller 76 determines that congestion is below a defined minimum congestion threshold it continues its congestion monitoring operations (Step 102).

However, if detected congestion is above the minimum threshold, congestion controller 76 adjusts service scheduler 74 to under-serve selected ones of the active data connections 60 that are supported by packet data channel 48. Under these circumstances, "selection" is an implied function rather than an explicit connection selection operation. That is, congestion controller 76 selects the data connections to be under-served based on biasing operation of service scheduler 74 toward maximum throughput scheduling such that the data connections corresponding to mobile stations 12 in poor radio conditions are naturally under-served. Thus, to some extent, congestion of packet data channel 48 is relieved simply by increasing the effective capacity of channel 48 through biasing service scheduler 74 toward maximum throughput scheduling.

However, the total reduction in congestion may be amplified by the behavior of any flow control mechanisms controlling data flow on the under-served ones of data connections 60. By biasing service away from the selected connections, congestion controller 76 precipitates data buffer overflows for the selected connections. Those overflows result in sustained data loss on the selected connections. In the presence of such data losses, the flow control mechanisms governing data flow on the selected connections typically will impose significant temporary data rate reductions on those connections experiencing data loss. Therefore, the congestion reduction effects gained by under-serving selected data connections is amplified by the congestion controllers triggering of flow control on the selected connections.

By exploiting this behavior, congestion controller 76 limits congestion-related data loss to the selected connections rather than allowing such data losses to occur across a potentially much larger subset of the data connection 60. In other words, the congestion controller 76 forces congestion-related data losses to occur on a much smaller subset of the active data connection 60, by biasing service away from the data connections associated with relatively poor service conditions. Congestion controller 76 thereby avoids the potential congestion collapse that might otherwise occur if flow control mechanisms were triggered across a greater number of the data connection 60.

After adjusting the service scheduler's bias, the congestion controller 76 preferably waits some defined period of time, nT, before again assessing congestion (Step 106), where n is some number and T is time in seconds. After waiting, the congestion controller 76 determines if congestion is still above the minimum threshold (Step 108). If congestion has fallen below the minimum threshold, the congestion controller 76 resets the scheduler to its normal service objectives, which here amounts to resetting scheduler 74 to operate as a QoS-based scheduler (Step 110).

However, if congestion levels remain above the minimum congestion threshold, congestion controller 76 determines whether congestion levels are below a maximum congestion threshold (Step 112). If congestion is below the maximum threshold, congestion controller 76 repeats its adjustment of the service scheduler 74 (Step 104), which may amount to proportionally increasing the maximum throughput bias of service scheduler 74. However, if congestion levels are above the maximum threshold, the congestion controller 76 sets operation of service scheduler 74 to pure maximum throughput scheduling. That is, congestion controller 76 overrides the nominal service objectives of service scheduler 74 such that it is completely biased toward maximum throughput scheduling.

Figure 5:
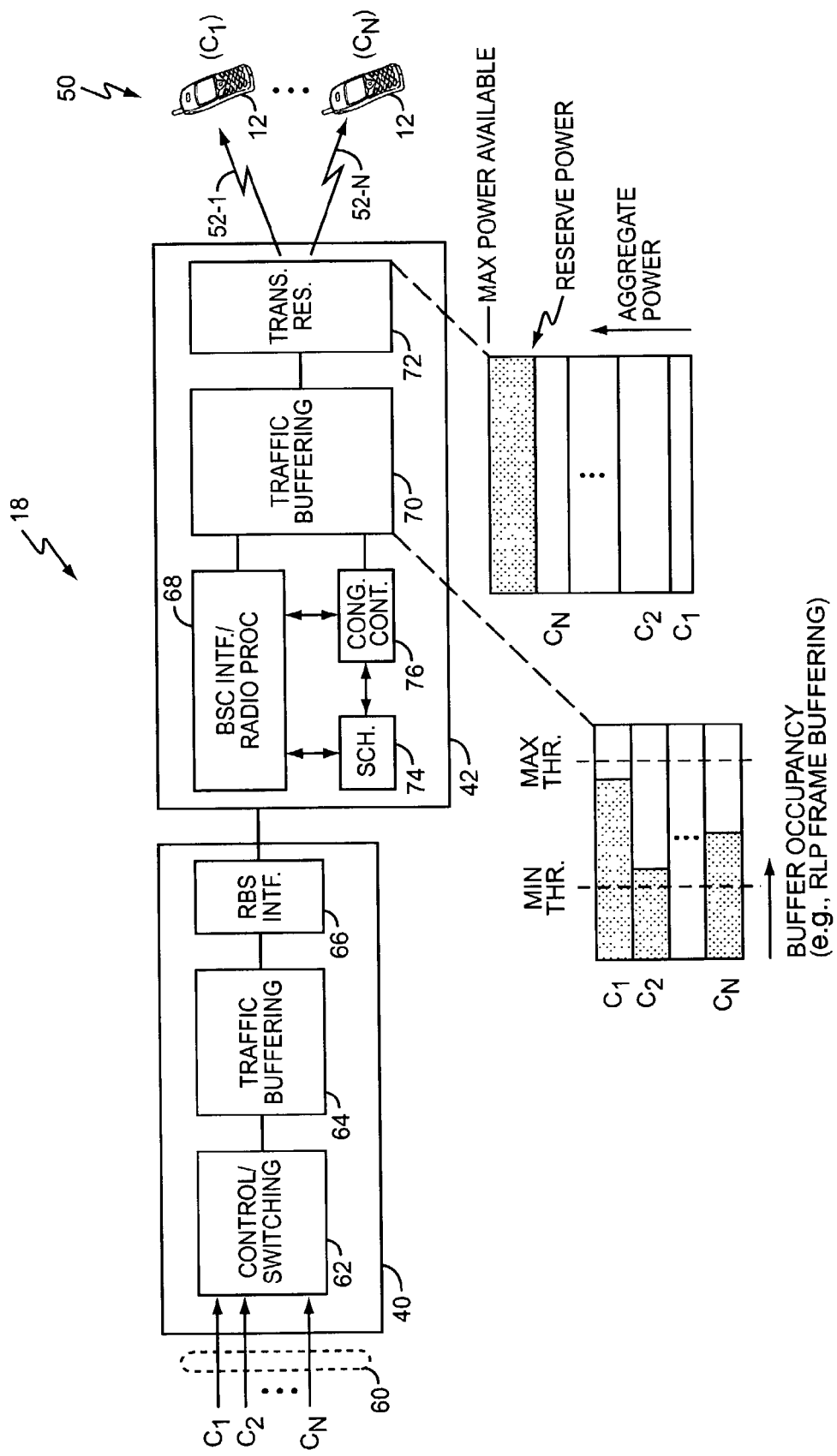
FIG. 5 is a diagram of an exemplary base station controller and associated radio base station.

FIG. 5 depicts essentially the same arrangement as shown in FIG. 3, but with the focus of congestion control on managing the shared power resource within transceiver resources 72 that is used by RBS 42 to transmit data on dedicated traffic channels assigned to individual mobile stations 12 in the group 50. Such channels may be, for example, the supplemental channels (SCH) used in cdma2000 to provide individual mobile stations 12 with their requested data services. Here, each one of the dedicated forward link channels 52 (52-1, . . . , 52-N) is supported by a coded transmit signal that is dedicated to a corresponding one of the mobile stations 12, such that each one of the plurality of supported data connections 60 is generally carried on the assigned forward link traffic channel.

Each of these transmit signals is allocated the required transmit power from a shared "pool" of available transmit power at RBS 42. The amount of power required for each of the transmit signals is a function of the radio conditions in which the corresponding mobile station 12 operates. Intuitively, one recognizes that mobile stations 12 in relatively poor radio conditions require higher transmit signal power from the RBS 42 to receive transmit signals at sufficient signal strengths.

Indeed, in most such wireless communication networks, mobile stations 12 provide power control feedback to network 10 such that transmit power is controlled to achieve the required signal quality at the receiving mobile stations 12. As the power requirement for the plurality of transmit signals fluctuates as a function of changing radio conditions, the aggregate power required for the plurality of transmit signals may rise to the point where the maximum power available at the RBS 42 is exceeded.

Such congestion of the shared power resource can have the same or similar deleterious effects as the packet data channel congestion described earlier. Thus, congestion controller 76 may be configured to control congestion on the shared power resource in addition to or as an alternative to controlling congestion on the shared packet data channel 48. Indeed, some network implementations may not provide shared packet data channels and operation of the congestion controller 76 may be limited to managing the shared power resource from which transmit power is allocated for the dedicated forward link traffic channels supported by RBS 42.

In that role, congestion controller 76 may detect overloading or congestion of the shared power resource much as it detects overloading of a shared packet data channel. That is, as the aggregate power requirement of the transmit signals corresponding to the data connections 60 rises to and/or exceeds the total available power at RBS 42, one expects to see a corresponding increase in buffer occupancy levels as the incidence of data retransmissions increases on one or more of the data connections 60. Alternatively, the congestion controller 76 may simply monitor the allocated power or the reserve power available at RBS 42 to determine congestion of the shared power resource. FIG. 5 depicts both buffer occupancy and/or reserve power level monitoring.

In managing the shared power resource, the congestion controller 76 operates in much the same manner as before by intentionally under-serving selected ones of the data connections 60 to reduce congestion of the shared power resource. Here, selectively under-serving denotes the congestion controller 76 intentionally under-allocating power to selected ones of the data connections 60 corresponding to mobile stations 12 operating in poor radio conditions. By allocating less than the requested transmit signal power levels to these selected connections, the congestion controller 76 reduces the aggregate power demands (congestion).

Further, demand reduction may be multiplied where the under-served data connections are subject to flow control. That is, by allocating less than the required power, the incidence of data loss on those connections generally increases and, beyond a certain point, the flow control mechanisms governing data transfer on the selected connections will temporarily impose potentially significant data rate reductions with commensurate decreases in the transmit signal power requirements of those connections.

Figure 6:
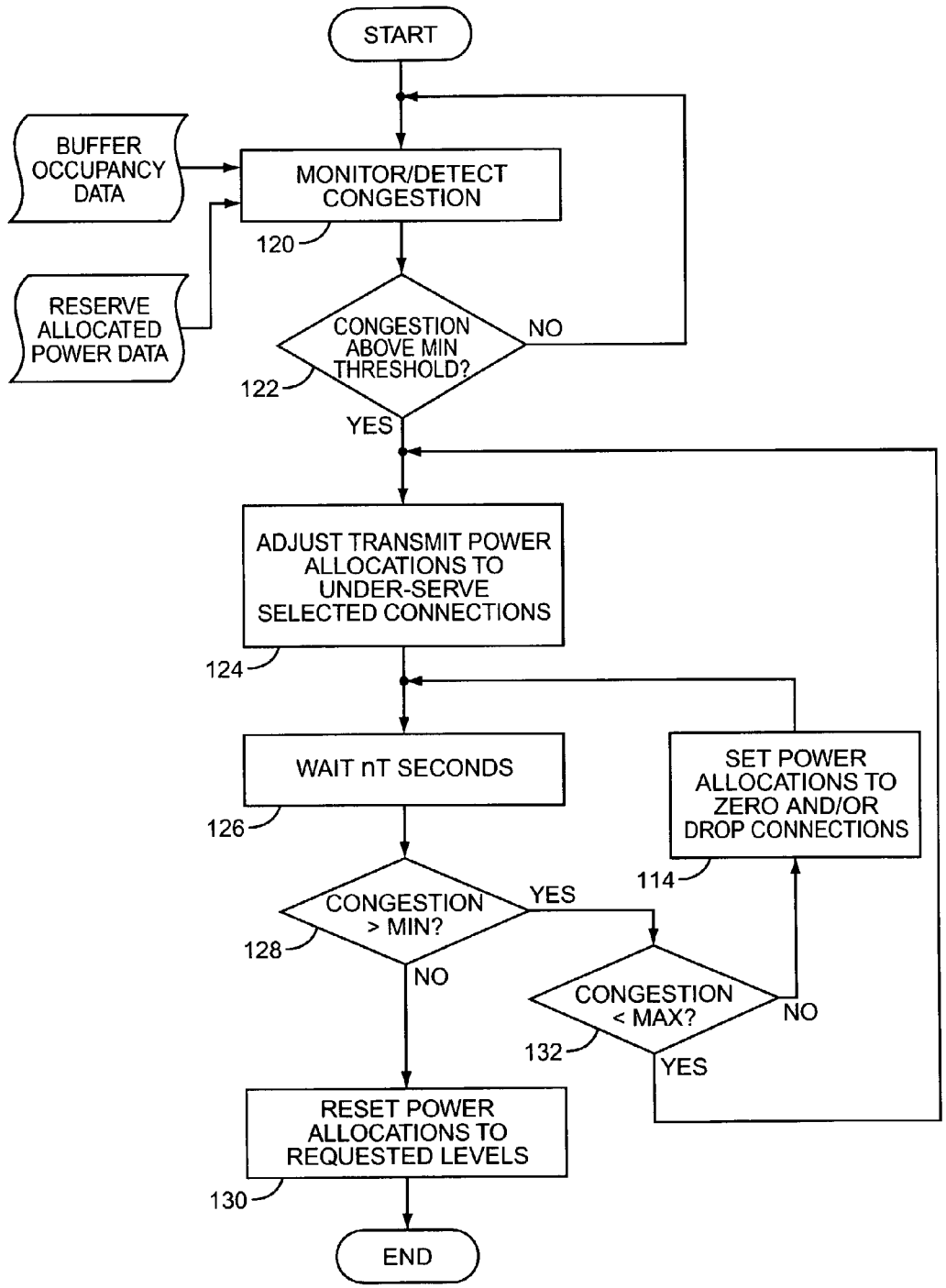
FIG. 6 is a diagram of exemplary flow logic supporting congestion management of a shared transmit power resource in accordance with the present invention.

FIG. 6 illustrates exemplary flow logic for congestion management of the shared transmit power resource at RBS 42. One sees that the essential congestion management is similar to that outlined in FIG. 4, thus the details presented here discuss only the operational differences. For example, at Step 120, congestion monitoring may use one or both buffer occupancy levels and reserve power to detect congestion of the shared transmit power resource at the RBS 42. In response to detecting congestion of the shared power resource, congestion controller 76 under-serves selected ones of the data connections 60 by allocating less than the requested transmit signal powers to those selected connections.

In an exemplary embodiment, the congestion controller 76 chooses the selected ones of the data connections 60 based on, for example, comparing the relative allocations of power among the data connections 60. Thus, connections corresponding to mobile stations 12 in relatively poor radio conditions will be allocated disproportionate shares of the total available power at RBS 42. The selected connections may therefore be those connections allocated more than a defined share of the available transmit power.

If congestion falls below the minimum threshold (Step 128), measured either in buffer occupancy or reserve power, the congestion controller 76 once again permits the allocated transmit powers for each of the connections 60 to return to the requested levels of transmit power. However, if congestion remains above the minimum threshold, the congestion controller 76 determines whether congestion is above a maximum threshold (Step 132), again measured in either buffer occupancy or reserve power levels. If congestion is below the maximum threshold, the congestion controller 76 again adjusts connection power allocation, possibly by further reducing the power allocated to the selected connections. If, however, congestion exceeds the maximum threshold, the congestion controller 76 may effectively "drop" the selected connections by reducing their corresponding power allocations to zero.

Figure 7:
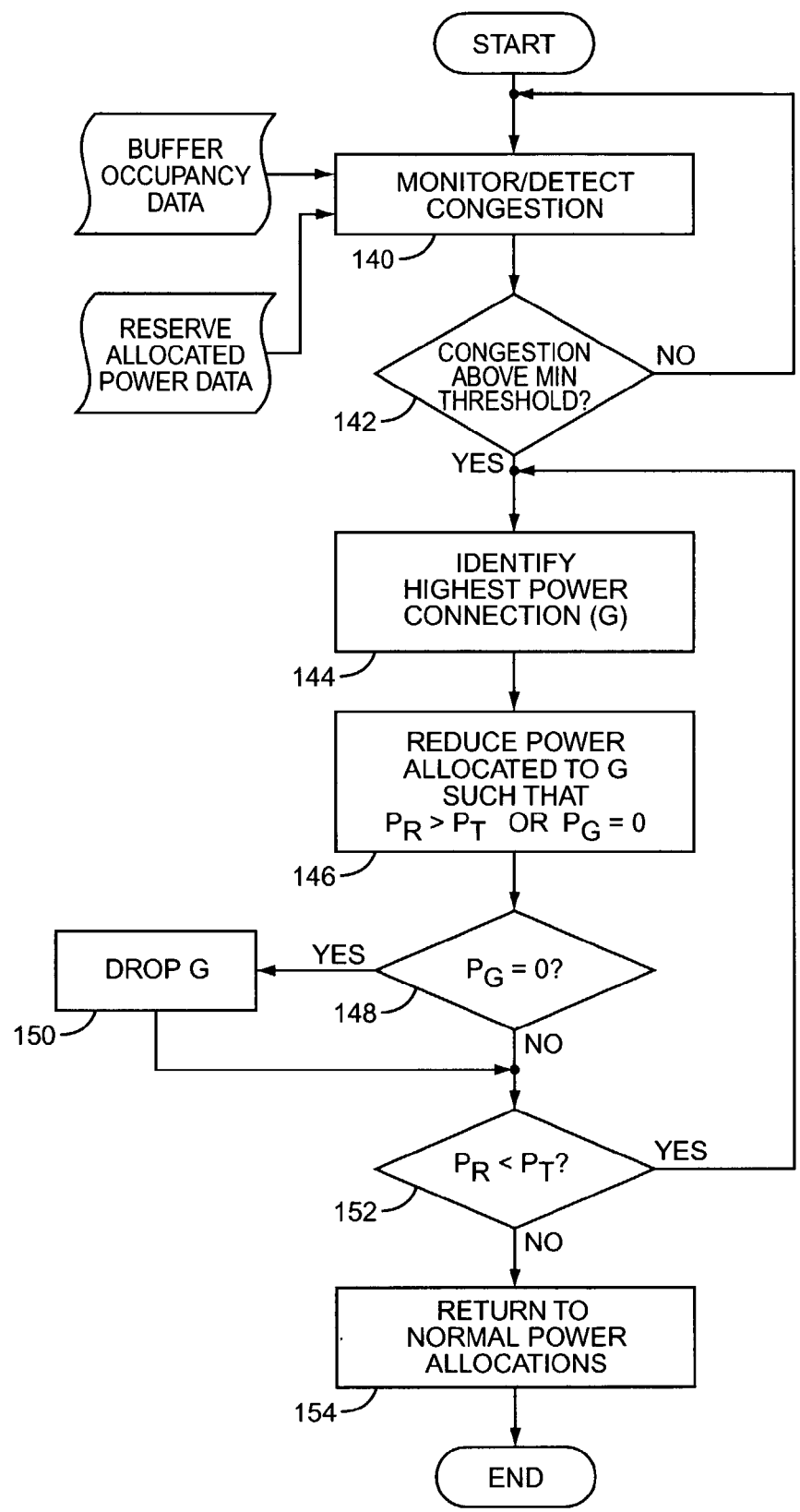
FIG. 7 is a diagram of alternate exemplary flow logic supporting congestion management of a shared transmit power resource in accordance with the present invention.

FIG. 7 illustrates a similar but alternate exemplary approach to congestion management of a shared transmit power resource. Steps 140 and 142 correspond to Steps 120 and 122 of FIG. 6, but in this alternate approach, congestion controller 76 identifies the highest powered one of the data connections 60 as the one connection to be under-served (Step 144), with the selected connection denoted as connection "G." The allocated power for connection G ($P_G$) is reduced until the reserve transmit power ($P_R$) at RBS 42 is above a defined reserve power threshold value ($P_T$), or until $P_G$ is at zero (Step 146). If $P_G$ is reduced to zero (Step 148), connection G is dropped (terminated) by network 10 (Step 150).

If the reserve power $P_R$ is still below the defined threshold $P_T$ (Step 152), the congestion controller 76 selects a "new" connection G by again identifying the highest powered one of the remaining connections 60 (Step 144) and repeats the above steps.

Thus, the inventive congestion controller 76 manages congestion of shared resources, such as shared transmitter resources and/or shared packet data channels, within a wireless communication network. Therefore, the congestion controller 76 has broad applicability to a wide range of wireless network types and is not limited to the exemplary details discussed above. Indeed, the present invention is limited only by the scope of the following claims, and the reasonable equivalents thereof.

What is claimed is:

1. A method of controlling resource overload in a wireless communication network comprising:
    serving a plurality of flow-controlled data connections supported by a shared network resource by transmitting flow-controlled data on a plurality of dedicated forward link channels from a radio base station, wherein a transmit power allocated to each forward link channel consumes a portion of a shared total transmit power available at the radio base station;
    detecting congestion of the shared network resource; and
    under-serving selected ones of the data connections to intentionally trigger higher-layer flow control on the selected data connections and thereby reduce congestion of the shared total transmit power.

2. The method of claim 1, wherein serving a plurality of flow-controlled data connections supported by a shared network resource comprises serving the plurality of data connections on a packet data channel shared by the plurality of data connections.

3. The method of claim 2, wherein serving the plurality of data connections on a packet data channel shared by the plurality of data connections comprises transmitting data to individual ones of the plurality of data connections in time-multiplexed fashion according to a service scheduler.

4. The method of claim 3, wherein detecting congestion of the shared network resource comprises detecting transmit buffer occupancies for the data to be transmitted to the plurality of data connections under control of the service scheduler.

5. The method of claim 1, wherein serving a plurality of flow-controlled data connections supported by a shared network resource comprises serving the plurality of data connections on a shared packet data channel according to a Quality-of-Service (QoS) based scheduling algorithm.

6. The method of claim 1, wherein detecting congestion of the shared network resource comprises detecting overuse of the total transmit power based on detecting buffer occupancies of one or more transmit buffers used to buffer the flow-controlled data being transmitted on the forward link channels.

7. The method of claim 1, wherein detecting congestion of the shared network resource comprises detecting overuse of the total transmit power based on monitoring available reserve transmit power at the radio base station.

8. The method of claim 1, wherein reducing the allocated power for the identified data connection comprises allocating less transmit power than is requested for the identified data connection, thereby causing loss of flow-controlled data on the identified data connection and triggering flow control on the identified data connection.

9. The method of claim 1, further comprising selecting the data connections to be under-served based on the relative allocation of transmit power among the forward link data channels, such that forward link channels requiring relatively high power allocations are selected.

10. The method of claim 1, further comprising selecting the data connections to be under-served based on relative transmit buffer occupancy levels for the flow-controlled data being transmitted on individual ones of the forward link channels, such that forward link channels associated with relatively high buffer occupancy levels are selected.

11. A method of controlling resource overload in a wireless communication network comprising:
    serving a plurality of data connections on a corresponding plurality of dedicated forward link channel signals transmitted from a radio base station that allocates a portion of its available transmit power to each forward link channel signal based on a requested transmit power level associated with each data connection;
    detecting overloading of the available transmit power; and
    reducing the overload by under-serving selected ones of the data connections based on allocating less than the requested power levels for the selected data connections by:
        identifying a highest powered one of the data connections; and
        reducing allocated power for the identified data connection until a reserve power level exceeds a defined power threshold or until the allocated power for the identified data connection is reduced to zero.

12. The method of claim 11, wherein allocating less than the requested power levels for the selected data connections comprises allocating from zero power up to a power level below the requested power level for each selected data connection.

13. The method of claim 12, wherein the data connections are flow-controlled data connections, and wherein under-serving the selected data connections is intended to intentionally trigger flow controls on the selected data connections such that overloading is substantially reduced.

14. The method of claim 11, further comprising selecting data connections requiring relatively high allocations of transmit power as the selected data connections that are under-served.

15. The method of claim 11, further comprising selecting data connections having relatively high transmit data buffer occupancy levels as the selected data connections that are under-served.

16. The method of claim 11, further comprising dropping the identified connection if the allocated power is reduced to zero.

17. The method of claim 11, further comprising identifying a highest powered one of the remaining data connections as a next identified data connection and reducing allocated power for the next identified data connection until the reserve power level exceeds the defined power threshold.

18. The method of claim 17, further comprising repeatedly reducing power allocations on successive next identified data connections selected from the remaining ones of the data connections until the reserve power exceeds the defined power threshold.

19. A radio base station for use in a wireless communication network comprising
- one or more processing circuits to serve a plurality of data connections associated with mobile stations receiving data from the network by transmitting data for each data connection on a dedicated traffic channel supported by an associated transmit signal generated by the transmitter resources, wherein each transmit signal is allocated a portion of a shared total transmit power available at the radio base station;
- transmitter resources coupled to the one or more processing circuits to generate one or more transmit signals for conveying the data from the network to the mobile stations; and
- a congestion controller to manage congestion of the shared total transmit power associated with serving the plurality of data connections by under-serving selected ones of the data connections responsive to detecting congestion to trigger higher-layer flow control on the selected data connections.

20. The radio base station of claim 19, wherein the radio base station transmits data to individual ones of the mobile stations on a shared packet data channel supported by a transmit signal generated by the transmitter resources.

21. The radio base station of claim 20, further comprising a service scheduler to schedule data transmissions for individual ones of the mobile stations on the shared packet data channel.

22. The radio base station of claim 21, wherein the congestion controller controls congestion of the shared packet data channel by detecting buffer occupancy levels associated with one or more transmit data buffers of an associated base station controller, the one or more transmit data buffers being used to buffer data to be transmitted on the shared packet data channel.

23. The radio base station of claim 22 wherein the congestion controller detects buffer occupancies at the base station controller based on receiving buffer occupancy reports from the base station controller.

24. The radio base station of claim 19, wherein the congestion controller under-serves selected ones of the plurality of data connections by allocating less than a requested power level to one or more ones of the plurality of data connections.

25. The radio base station of claim 24, wherein the congestion controller selects one or more of the plurality of data connections as the selected ones to be under-served based on the allocated portions of shared total transmit power.

26. The radio base station of claim 24, wherein the congestion controller:
- selects the data connection having a highest allocated portion of the shared total transmit power; and
- reduces allocated power to the selected data connection until a total allocated transmit power falls below a first threshold or the allocated power for the selected data connection is reduced to zero.

27. The radio base station of claim 26, wherein the congestion controller repeatedly selects one of the remaining data connections having a next-highest allocated power as the selected data connection and repeats the reduction of allocated power until the total allocated transmit power falls below the first threshold.

28. A radio base station for use in a wireless communication network comprising
- transmitter resources to generate one or more transmit signals for conveying data from the network to mobile stations;
- one or more processing circuits coupled to the transmitter resources to serve a plurality of data connections on a corresponding plurality of dedicated forward link channel signals transmitted to the mobile stations, said processing circuits allocating a portion of an available network transmit power to each forward link channel signal based on a requested transmit power level associated with each data connection; and
- a congestion controller to reduce overload of the available network transmit power associated with serving the plurality of data connections by under-serving selected ones of the data connections responsive to detecting the overload by:
  - identifying a highest powered one of the data connections; and
  - reducing allocated power for the identified data connection until a reserve power level exceeds a defined power threshold or until the allocated power for the identified data connection is reduced to zero.

* * * * *